United States Patent Office 3,506,399
Patented Apr. 14, 1970

3,506,399
RECLAMATION OF SPENT SULFURIC ACID
Steven L. Estes, Jr., Mobile, Ala., assignor to Stauffer Chemical Company, New York, N.Y., a corporation of Delaware
No Drawing. Filed Mar. 27, 1968, Ser. No. 716,343
Int. Cl. C01b *17/90*
U.S. Cl. 23—172                9 Claims

ABSTRACT OF THE DISCLOSURE

A method is provided for the purification of sulfuric acid contaminated with organic impurities by contacting the acid with carbon bisulfide. This process is particularly suitable for purifying sulfuric acid used for drying chlorine gas. An aeration step can be optionally employed if desired.

---

The present invention relates to the reclamation of spent sulfuric acid through the removal of contaminants. More particularly, this invention relates to the purification of spent sulfuric acid used to dry chlorine gas produced by the chlorine-caustic process through the removal of inorganic impurities and colorants.

In the production of gaseous chlorine through the electrolytic decomposition of brine, the chlorine is effectively dried by passing it through concentrated sulfuric acid. This washing serves to remove from the gas both the water, organic impurities and other entrained impurities. After the acid has been spent and reduced in strength to about 78–82%, it is subjected to conventional aeration. After aeration, the acid contains up to 1 g.p.l. chlorine and is green in color from the dissolved gas and organic impurities. Accordingly, this spent acid can be utilized only in such applications wherein a high tolerance to such impurities is permitted. As could be expected, the number of such applications is limited, and the price for such spent acid is considerably diminished.

In accordance with this invention, a method has been provided, whereby spent sulfuric acid is extracted with carbon bisulfide in order to effectively remove chlorine and/or organic impurities. Subsequent to this extraction the treated spent acid can be successfully purged of residual carbon bisulfide by aerating. The carbon bisulfide can be effectively separated from the extracted contaminants by distillation or other conventional purification steps and can be recycled or used elsewhere as requirements dictate.

The extraction of spent sulfuric acid with carbon bisulfide can be conducted by batch or continuously utilizing in each instance suitable equipment in respect to corrosion and process. For example, conventional mixer—settler units which effectively provide agitation and contact between the acid and the carbon bisulfide can be used.

While the amount of carbon bisulfide necessary to effect substantially complete extraction will vary with respect to the amount and types of contaminants present, the amounts generally range from about 1 to about 10 parts by volume carbon bisulfide to 2 parts by volume sulfuric acid to be purified. It is preferred, however, to utilize from about 1 to about 2 parts by volume per 2 parts by volume acid.

The carbon bisulfide specified can be utilized in a single extraction step or can be utilized in multiple extractions of from 2 to 10 or more if desired.

When continuous extraction is utilized, the acid is recycled in the system to fresh extractant or can be passed to a second extraction stage.

The acid which has been extracted by the method of this invention contains less than 1 p.p.m. chlorine, and negligible organics as indicated by its APHA color of 35 or lower. Residual $CS_2$ is, however, generally present. This can be removed, however, as stated earlier, by aerating the acid, purging with nitrogen or other such conventional method. After aeration, $CS_2$ concentration is less than 1 p.p.m. and turbidity is less than 10 p.p.m.

While the foregoing description of this invention has been directed to reclamation of spent sulfuric acid utilized in drying chlorine gas produced by the chlorine caustic process, it is to be understood that the application of this invention is not limited to this particular utility and can be used to remove contaminant chlorine, organics or colorants from any contaminated sulfuric acid.

If desired the spent acid can be aerated prior to treatment in accordance with the invention. While such a pretreatment aeration step has little substantive effect, it does serve to remove some of the chlorine values remaining in the acid.

After the spent acid has been purified in accordance with this invention, it can be treated with sulfur trioxide to increase its strength.

The APHA color standard employed in the example below is fully described in "Standard Methods for the Examination of Water Sewage, and Industrial Wastes," American Public Health Association Inc., 10th ed., p. 88 (1955).

The example which follows serves to illustrate this invention. In these examples and throughout this specification all parts and percentages are by weight unless otherwise specified.

EXAMPLE 1

Spent sulfuric acid from chlorine tower was analyzed after conventional aeration and was found to contain 600 p.p.m. chlorine, 67 p.p.m. organics determined as carbon disulfide extractable nonvolatile material, appreciable green color, and was very slightly turbid.

The spent acid, after two hours additional aeration with air equivalent to 1700 times the volume of spent acid retained 304 p.p.m. chlorine. The green color was reduced somewhat, but the very slight turbidity remained.

The spent acid was again aerated for 16 additional hours in which time 13,600 times its volume of air was sparged through the acid. Chlorine concentration was then analyzed at 206 p.p.m. The acid was still green in color, but again somewhat reduced.

EXAMPLE 2

Another spent sulfuric acid sample from a chlorine drying tower was analyzed after conventional aeration and found to contain 402 p.p.m. chlorine, appreciable green color with an absorbance of 0.320 unit per inch light path at 385 millimicrons, and very slight turbidity.

This spent acid was extracted once with an equal volume of carbon bisulfide. A 500 ml. separatory funnel containing 100 ml. of each phase was shaken vigorously for two to three minutes. The bulk of the phases separated well, however, a very small amount of finely dispersed carbon bisulfide particles did remain in the acid phase after primary separation causing the acid to appear very turbid. Turbidity was determined to be between 500 and 1,000 p.p.m. $BaSO_4$ equivalent. Less than 1 p.p.m. chlorine remained. Most of the finely divided carbon bisulfide was then removed from the acid by vacuum filtration. Approximately 100 p.p.m. carbon bisulfide were then analyzed in the acid phase. The green color was greatly reduced with an absorbance of 0.060 unit per inch light path at 385 milli-microns. On the APHA color scale the color was determined to be between 35 and 20.

The $CS_2$ concentration in the acid was then reduced to less than 1 p.p.m. by aeration. Approximately 20 to 40 times the acid volume of air was sparged through 100 ml. of the acid in a 125 ml. gas washing bottle.

The residual $CS_2$ after extraction can also be reduced to less than 1 p.p.m. by aeration alone. A sample of spent acid, extracted once with an equal volume of $CS_2$ and aerated sufficiently to reduce the $CS_2$ concentration to less than 1 p.p.m., had a turbidity of less than 8 p.p.m. $BaSO_4$ equivalent.

A sample of spent acid was extracted twice with equal volumes of carbon bisulfide and vacuum filtered to remove the bulk of the residual carbon bisulfide. The green color was still further reduced with an absorbence of 0.020 unit per inch light path at 385 milli-microns and an APHA color of approximately 20. Again, good phase separation was noted during the extraction with turbidity due to residual carbon bisulfide equivalent to 500–1000 p.p.m. $BaSO_4$.

EXAMPLE 4

Alternative purification procedures were evaluated wherein carbon tetrachloride was utilized as the extractant. Poor phase separation occurred. Substantial green color remained.

Spent acid was heated to a temperature of 280° C. and maintained at this temperature for a period of two hours. The color changed from green to brown. The brown color could not be removed by subsequent extraction with carbon bisulfide.

What is claimed is:

1. A process for purifying organic contaminated sulfuric acid which comprises intimately contacting said acid with carbon bisulfide and separating said acid from the major portion of carbon bisulfide.

2. The process as defined in claim 1, wherein the spent sulfuric acid is contaminated acid from the drying step of a chlorine caustic operation.

3. The process of claim 1, wherein the carbon bisulfide is used in an amount of from about 1 to about 10 parts by volume to 2 parts by volume sulfuric acid to be purified.

4. The method of claim 1, wherein the carbon bisulfide is used in an amount of from about 1 to about 2 parts by volume per 2 parts by volume sulfuric acid to be purified.

5. The process of claim 1, wherein the process is conducted as a batch operation.

6. The process of claim 1, wherein the process is conducted as a continuous operation.

7. The process of claim 1, wherein the sulfuric acid treated is aerated prior to introduction of the said process.

8. The process of claim 1, wherein the purified acid is treated subsequently with sulfur trioxide to increase the acid strength.

9. The method of claim 1, wherein residual carbon bisulfide is removed from the extracted sulfuric acid by aeration.

References Cited

UNITED STATES PATENTS 3,333,924   8/1967   Hazen et al. _____ 23—172
1,423,767   7/1922   Hechenbleikner et al. _ 23—173

OSCAR R. VERTIZ, Primary Examiner

C. B. RODMAN, Assistant Examiner

U.S. Cl. X.R.

23—312